Patented Sept. 14, 1926.

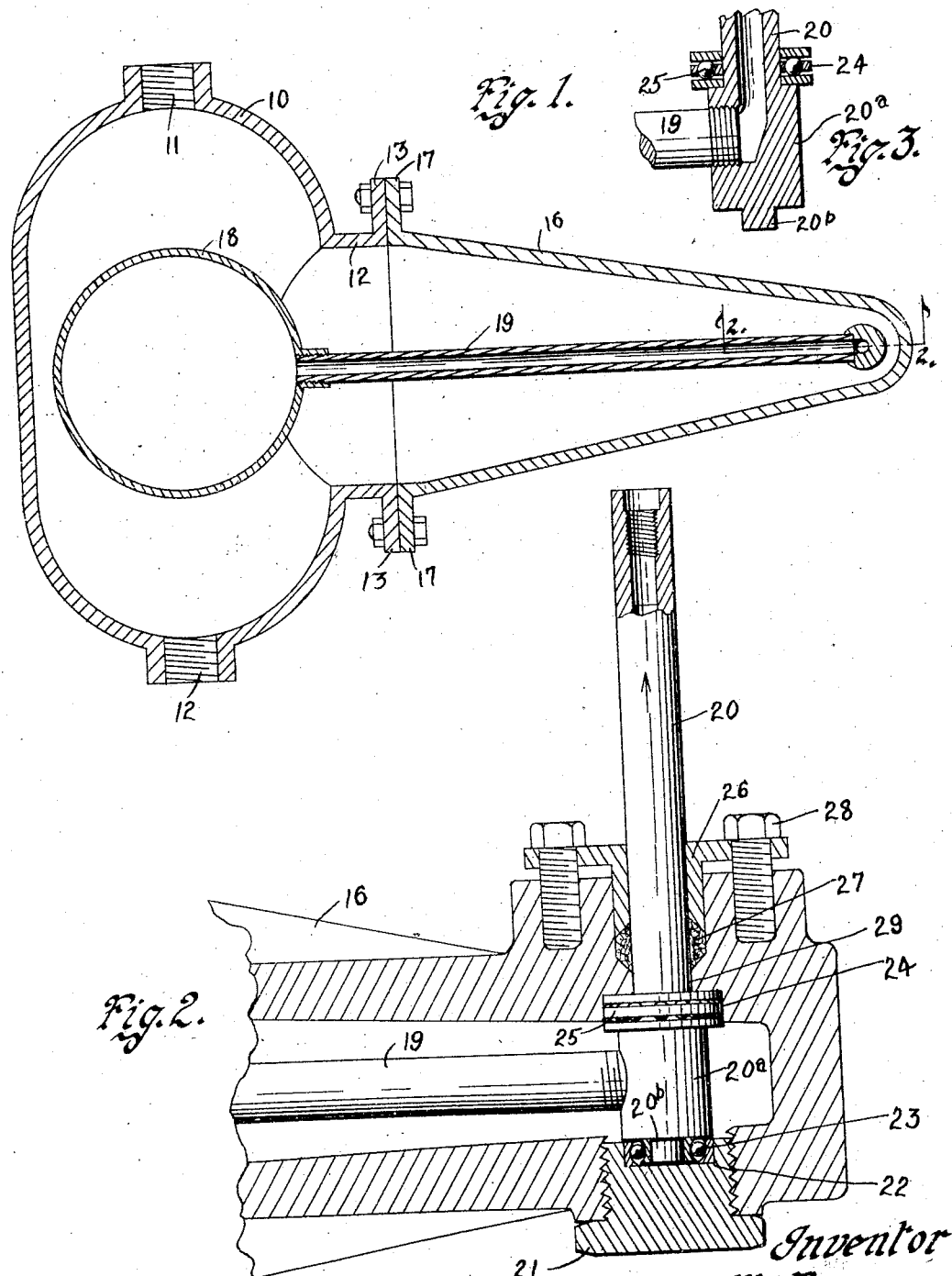

1,600,162

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

FLOAT-ARM MOUNTING.

Application filed May 15, 1926. Serial No. 109,412.

More particularly it is my object to provide a float arm mounting having parts so constructed and arranged as to make possible the easy, convenient and quick assembly or disassembly of the parts of the mounting.

Still a further object is to provide such a mounting whereby the float arm may be mounted in a casing and provided with a shaft or the like extending through the casing wall and rotatably mounted therein at right angles to the arm or actuating mechanism outside the casing with a minimum of binding or friction among the parts.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a vertical sectional view through a float arm casing and float arm mounting embodying my invention.

Figure 2 is a detailed sectional view taken on the line 2—2 of Figure 1, the float arm, the shaft and one of the bearings being shown in plan.

Figure 3 is a detailed sectional view of the parts of the mounting taken on the same section line.

My float arm mounting is used in a considerable variety of installations. For illustration, it is used sometimes in float structures of the kind shown in my prior application, Serial Number 3,766, filed January 21, 1925.

My float arm structure is used ordinarily in connection with mechanisms wherein a float is employed to operate or control a valve for maintaining liquid at a predetermined level in a tank or the like. For instance, in oil fields where the oil and gas coming from a well are conducted into a tank, it is desirable that the oil be maintained at a certain level in the tank, so that the oil can be taken off through one pipe and the gas taken off through another pipe. It is desirable to maintain the oil level substantially above the oil take off pipe and substantially below the gas take off pipe in order to insure proper separation of oil and gas. In accomplishing this purpose, it is a rather common practice to provide a float adapted to rest on the oil and to control the oil outlet valve from this float. This practice involves the necessity of providing the float with an arm, connecting the arm with a shaft, extending the shaft through the wall of the float chamber and connecting the outside of the chamber with the valve located at some distance from the float arm chamber.

In the accompanying drawings I have used the reference numeral 10 to indicate generally a float chamber having the upper and lower ports 11 and 12 which are designed to be connected with a tank or the like respectively above and below the liquid level line therein. Thus it follows that the liquid level in the float chamber 10 will be the same as that in the tank.

The float chamber 10 has at one side a short tubular extension 12 provided with a peripheral flange 13. A float arm casing 16 in the form of a hollow cone closed at its small end or apex, has at its open end a peripheral flange 17 suitably bolted to the flange 13.

In the float chamber 10 is a float 18 which may have the form of a hollow copper ball. Connecting with the float 18, peripherally communicating with the interior thereof is a tubular float arm 19. A tubular shaft 20 extends through the wall of the float arm casing 16 and is connected with the float arm 19. Thus, when the float 18 is raised or lowered, the rocking of the shaft 20 actuates mechanism not here shown, for controlling the valve not shown.

The general arrangement of a structure of this kind in which the shaft 20 is arranged at right angles to the arm 19 and extends through the wall of the float arm casing, involves a number of difficulties in practical manufacture, installation, and use.

It is of great importance that the float should work freely and accurately. If it fails to work properly, even for a short time, losses in connection with the handling of the profits from an oil well may become very substantial. Similarly substantial losses might occur if the process of repairing or replacing the float arm structure or parts thereof should be slow or difficult. I have endeavored to meet the problems thus involved in the float arm structure herein disclosed which I will now describe in greater detail.

The shaft 20 is tubular and has at its inner end, an enlarged portion 20ª terminating in a spindle 20ᵇ. The tubular float arm 19 screws into the enlarged portion 20ª of the shaft 20 and communicates with the interior thereof where the tubular float arm and tubular shaft are used and connected in the manner just described. Shots can be dropped into the shaft 20 and passed into the float 18 for varying the weight thereof in the manner and for the purposes disclosed in my prior application mentioned above.

Screwed into one side of the float arm casing 16 is a nut 21 having a recess 22 in its inner face. Received in the recess 22 is a ball bearing assembly 23 which receives and supports the spindle 20ᵇ as shown in Figure 2. Opposite the recess 22 the inner face or wall of the casing 16 is provided with a recess 24 in which is mounted a ball thrust bearing 25 through which the shaft 20 is projected. Where the shaft 20 emerges from the casing 16, a tight joint is provided by means of a packing gland 26, packing 27 and stud bolts 28.

It is difficult, I have found, to insure the certain and easy actuation or rotation of the shaft 20. Frequently there is considerable pressure in the float chamber and float arm casing. In spite of care in providing bearings, there is pressure against the inner end of the shaft 20, tending to move it longitudinally in the direction indicated by the arrow in Figure 2. This, of course, causes some tendency to bind. The shaft is ordinarily used with an arm or lever at its outer end.

It will thus be seen that such lever and the float arm 19 form cranks and that the transmission of motion from one to the other also has a tendency to cause the float arm mounting to bind. It doesn't take very much tendency to bind to interfere with the smooth and accurate operation of the float and the valve operated by it. It is therefore highly desirable to eliminate any binding as far as possible. It is necessary at the same time to make access to the float arm parts easy.

For this purpose I have provided the screw plug 21 which carries the ball bearing assembly 23. It will be seen that the screw plug 21 may be quickly and easily inserted or taken out. It is thus easy to have access to the ball bearing 23 and to withdraw the shaft 20 including the enlarged portion 20ª thereof. The enlarged portion 20ª forms a shoulder which helps to hold the ball bearing assembly 23 in position. The thrust bearing 25 is mounted in the recess 24 on the interior of the casing 16 opposite the screw plug 21. The thrust bearing 25 may be installed or removed through the opening for the screw plug 21. The end of the enlarged portion 20ª forms a shoulder for holding the thrust bearing 25 in position.

In the installation of my float arm mounting, the thrust bearing 24 is slipped onto the long end of the shaft 20 until it stands adjacent to the enlarged portion 20ª. The long end of the shaft 20 is then inserted through the opening for the plug 21 and through the opening 29 in the wall of the casing 16 until the thrust bearing 25 is received in the recess 24. The ball bearing assembly 23 is then placed in the recess 22 and the plug 21 is screwed into place. As the plug 21 moves into place the spindle 20ᵇ will enter the ball bearing assembly 23. The packing 27 is then put in and the gland 26 installed. The arm 19 is then screwed into the enlarged portion 20ª of the shaft 20 and thereafter the float arm casing 16 is bolted to the float chamber 10.

I believe that I have provided in my present float arm mounting a combination which has never before been used in a like assembly and which involves substantial advantages in providing a structure adapted for use where the movement of the float must be accurately transmitted with a minimum of friction and loss of power to a valve or other mechanism.

While I have shown my float arm mounting assembled in a structure similar to that of my prior application hereinbefore mentioned, it is my intention to cover by my claims any form of structure in which my mounting might be used in connection with a float and a mechanism actuated therefrom.

I claim as my invention:

1. In a device of the class described, the combination of a float chamber, a tapered float arm casing detachably mounted on said chamber, a shaft projected through a wall of the float arm casing and having an enlarged portion within the casing, said casing having a recess on its interior, a thrust bearing receiving said shaft and mounted in said recess adjacent to said enlarged portion, a screw plug mounted in the wall of said casing having a recess at its inner end, an anti-friction assembly in said last recess, said shaft having a spindle at one end of said enlarged portion received in and supported by said anti-friction assembly.

2. In a device of the class described, a float arm casing having near one end an opening through its wall, said opening having an enlarged portion at its inner end, a thrust bearing structure received in said enlarged portion, said opening being formed with an enlarged portion at its outer end, a packing gland projected into said last named enlarged portion, a screw plug mounted in the wall of said casing opposite said bearing and having a recess in its inner face, an anti-friction bearing assembly received in the said recess, a shaft projected through the said opening and said packing gland, said shaft having within the casing an enlarged portion arranged with its ends adjacent to the respective bearing devices and having a spindle received and supported by the second bearing device and a float arm connected with said enlarged portion of the shaft.

3. In a structure of the class described, a float arm casing, a float arm therein, a shaft connected with said arm and projecting through one wall of said casing, said shaft having an enlarged portion within the casing, a thrust bearing interposed between said enlarged portion and the wall of the casing through which the shaft emerges and a ball bearing for mounting the shaft in the other side of the casing.

LYLE W. BROWNE.